United States Patent
Maupin

(10) Patent No.: US 10,065,136 B2
(45) Date of Patent: Sep. 4, 2018

(54) ROTARY DRUM WITH SCREEN FOR PROCESSING FOOD

(71) Applicant: Lyco Manufacturing, Inc., Columbus, WI (US)

(72) Inventor: Daniel D. Maupin, Corvallis, OR (US)

(73) Assignee: Lyco Manufacturing, Inc., Columbus, WI (US)

( * ) Notice: Subject to any disclaimer, the term of this patent is extended or adjusted under 35 U.S.C. 154(b) by 0 days.

(21) Appl. No.: 14/522,639

(22) Filed: Oct. 24, 2014

(65) Prior Publication Data

US 2015/0114901 A1 Apr. 30, 2015

Related U.S. Application Data

(60) Provisional application No. 61/895,608, filed on Oct. 25, 2013.

(51) Int. Cl.
*B01D 33/067* (2006.01)
*B01D 33/11* (2006.01)
*A22C 21/00* (2006.01)

(52) U.S. Cl.
CPC ................................. *B01D 33/11* (2013.01)

(58) Field of Classification Search
CPC combination set(s) only.
See application file for complete search history.

(56) References Cited

U.S. PATENT DOCUMENTS

| 3,431,713 | A | * | 3/1969 | Knicely | A01D 43/00 100/126 |
|---|---|---|---|---|---|
| 4,401,564 | A | * | 8/1983 | Epper | B01D 33/0012 210/150 |
| 4,541,929 | A | * | 9/1985 | Janusch | B01D 33/067 210/217 |
| 4,915,830 | A | * | 4/1990 | Mackay | D21C 9/02 100/117 |
| 5,009,795 | A | * | 4/1991 | Eichler | A23J 3/346 100/117 |
| 5,182,008 | A | * | 1/1993 | Shelstad | B01D 33/11 209/270 |
| 5,357,855 | A | * | 10/1994 | Ishigaki | B30B 9/12 100/112 |
| 6,596,166 | B1 | * | 7/2003 | Danielsson | B01D 33/11 210/324 |
| 7,735,415 | B2 | | 6/2010 | Zittel et al. | |
| 8,006,613 | B2 | | 8/2011 | Stousland et al. | |

(Continued)

*Primary Examiner* — Krishnan S Menon
*Assistant Examiner* — Ryan Huang
(74) *Attorney, Agent, or Firm* — George R. Corrigan

(57) ABSTRACT

An apparatus for separating liquid from food product includes a rotable drum mounted in a frame. The ends of the drum are comprised of rigid structural material, and each includes a sealing band. An inlet at the first end receives food product and liquid. Food product solids, with less water than received, are discharged from an outlet at the second end. One or more helical flights extend between the ends. The flights have an outer edge, and a flexible mesh screen is wrapped about and intermittently supported by the outer edge. The ends of the screen are held in the sealing bands, and the longitudinal edges of the screen are held by a seal extending between the sealing bands. Liquid can pass through the screen and food product is retained in the drum by the screen, and moved to the outlet by the flights.

12 Claims, 4 Drawing Sheets

(56) References Cited

U.S. PATENT DOCUMENTS

| | | |
|---|---|---|
| 8,087,348 B2 | 1/2012 | Maupin et al. |
| 8,776,674 B2 | 7/2014 | Maupin et al. |
| 8,839,712 B2 | 9/2014 | Stousland et al. |
| 2004/0020123 A1* | 2/2004 | Kimura ................ F17C 11/007 48/127.3 |
| 2004/0052702 A1* | 3/2004 | Shuman ................ A23L 3/003 422/208 |
| 2010/0043649 A1* | 2/2010 | Maupin ................ A23B 7/06 99/348 |
| 2012/0103920 A1* | 5/2012 | Morgan ................ B01D 29/35 210/791 |

* cited by examiner

ROTARY DRUM WITH SCREEN FOR PROCESSING FOOD

FIELD OF THE INVENTION

The present invention relates generally to the art of screens used for processing foods. More specifically, it relates to rotary drum screens used to dewater food product or to remove food product from water.

BACKGROUND OF THE INVENTION

The food processing industry has a need for dewatering food product—for removing food product from liquid or water. For example, processing food such as poultry requires a large amount of water. Water, after being used to process poultry, often includes small pieces of food product. It is desirable to separate as much of the food product from the water as possible. Recovered solids can be used or sold for rendering. Recovered water can be reused upstream. However, recovered water can plug nozzles when reused. To avoid plugging nozzles it is desirable to remove particles in the water. Thus, there is a need to dewater food product. Processing food, as used herein, includes cooking, blanching and cooling food product, and cleaning, treating with liquid or water, and reclaiming liquid or water to clean, cook, blanch or cool food product. Food product, as used herein, includes food, raw materials processed into food, and waste generated while processing food.

One prior art technique for removing solids from liquid or water is a dissolved air flotation (DAF) system. DAF systems can be expensive, and can use chemicals that result in recovered solids that cannot be used for rendering.

Rotary drum screens for dewatering food product are known in the prior art. Generally, food and water, or a food slurry, enters a first end of a rotary drum wrapped circumferentially with a screen. The drum is mounted in a frame and rotated. As the drum is rotated, water passes through the screen, and the food product is dewatered. The dewatered product exits from the second end of the drum.

The construction of the screen for a rotary drum is such that the screen is rigid and self supporting. For example, prior art rotary drum screens are typically perforated metal plates or comprised of wedge wire. They can screen particles as small as 0.020 inches (about 500 microns). Some screens also have slot-like openings through which narrow things such as hair can pass. These screens cannot be made to screen smaller particles because their self-supporting construction does not allow for smaller openings. Rigid screens rotate with drum because the screen is part of the support structure.

Mesh screens can strain very small particles 0.005 inches (125 microns) or 0.008 inches (200 microns). Screens of this opening size use very small wires in a mesh weave, and are very flexible and somewhat fragile. Applications requiring fine screening have typically been done with stretched flat screen. The screen is vibrated in a circular fashion, or the screen is on an incline to allow the liquid and solids to flow down a slope. Retention time and effectiveness is controlled by length of the screen and the angle of inclination.

Mesh screens have not been well-suited for rotary drums because they do not have sufficient strength to be self-supporting and must be supported by some external means. Different methods have been used in the prior art to provide the needed support, including wrapping the wire mesh around a heavier structural perforated plate or other supporting structure, and welding or clamping it into place. The perforated plate provides the structure, and the fine mesh provides the necessary resolution to screen small particles.

Such prior art rotary mesh screens suffer from several deficiencies. First, the perforated plate or other supporting structure makes the screen difficult to clean. Also, the percent open area is greatly reduced by the supporting structure, thus reducing the amount of water that can be removed—current waste water screening with a fine screen is limited to several hundred gallons per minute. Third, because they are mounted to a perforated plate, it is difficult to change screens to accommodate a different size opening. These drawbacks have limited the use of fine wire screens.

Cleaning fine mesh screens has been difficult, and spray nozzles have been used to back flush the screens to make them function for a reasonable period of time. Flat stretched screens are cleaned using a variety of methods, including using an array of nozzles under the entire screening surface. This requires extensive use of cleaning water, and detracts from the capacity of the screen. Some inclined flat screens use moving sprays above, and/or below the screen to shear off the material. This increases mechanical complexity and service and maintenance costs. Others use a moving belt which is difficult to clean.

Recovery of waste water in a food plant is becoming an economic necessity in many food industries. Thus, a design is needed that is of a more sanitary design, will be able to rapidly change screen sizes for different screening applications and have a more effective open area, all without damaging the fragile screen material while providing support for the mesh material. Accordingly, it is desirable to have a rotating drum screen for use in food processing that is comprised of a small opening, such as a fine wire mesh, yet able to be supported without adversely limiting the amount of dewatering able to be accomplished. Preferably, the screen is relatively easy to clean, and allows for rapidly change screen sizes for different screening applications and have a more effective open area, all without damaging the fragile screen material while providing support for the mesh screen.

SUMMARY OF THE PRESENT INVENTION

According to a first aspect of the invention a rotary drum used to separate liquid from food product is mountable in a frame and is rotatable. The drum has first and second ends, and both ends are comprised of rigid structural material. Each end includes a sealing band. An inlet is disposed at the first end, to receive food product and water or liquid. An outlet is disposed near the second end, and food product solids are discharged from the outlet, with less water than received at the inlet. One or more helical set of flights extend between the two ends. The flights have an outer edge, and a flexible mesh screen is wrapped about and intermittently supported by the outer edge. The two ends of the screen are each held in a sealing band, and the longitudinal edges of the screen are held by a seal extending between the sealing bands. Liquid can pass through the screen and food product is retained in the drum by the screen, and moved to the outlet by the flights.

According to a second aspect of the invention a food processing machine includes a rotary drum, at least one helical set of flights, at least one removable flexible mesh screen, and a longitudinal seal. The rotary drum is rotatably mounted in a frame, and has an inlet first end, and an outlet second end. Each end is comprised of rigid structural material, and each end includes a sealing band. The flights extend between the ends. The flights have an outer edge, about which is wrapped the removable flexible mesh screen and which intermittently support the screen. The sealing bands secure the ends of the screen and the longitudinal seal joins the longitudinal edges of the screen, and extends between the sealing bands. Liquids can pass through the screen and food product is retained in the drum by the screen.

According to a third aspect of the invention a food processing machine includes a rotary drum, at least one helical set of flights, at least one flexible mesh screen The rotary drum is rotatably mounted in a frame, and has an inlet first end, and an outlet second end. The flights extend between the ends and has an outer edge about which is wrapped the flexible mesh screen. A second rotary drum, including helical flights with a screen wrapped about the flights, receives food product being discharged by the first drum.

A cleaning spray bar is disposed to spray fluid on at least a portion of the screen in one embodiment.

According to a fourth aspect of the invention a food processing machine includes a rotary drum, at least one helical set of flights, at least one flexible mesh screen, a longitudinal seal and a cleaning spray bar. The rotary drum is rotatably mounted in a frame, and has an inlet first end, and an outlet second end. Each end is comprised of rigid structural material, and each includes a sealing band. The flights extend between the ends. The flights have an outer edge about which is wrapped the flexible mesh screen, and intermittently support the screen. The sealing bands secure the ends of the screen and the longitudinal seal joins the longitudinal edges of the screen, and extends between the sealing bands. The cleaning spray bar sprays fluid on at least a portion of the screen. Liquids can pass through the screen and food product is retained in the drum by the screen.

The cleaning spray bar is stationary or moveable in various embodiments.

The rotary drum has at least one supporting beam attached to, such as by welding or in another manner, and supporting the flights in one alternative.

The at least one supporting beam is between the outer edge and an axis of the drum, and/or is a plurality of supporting beams, and/or each is disposed to be parallel to an axis of the drum, and/or each is radially equidistant from a pair of adjacent supporting beams, in various embodiments.

The plurality of supporting beams includes N supporting beams, and there less than, or at least N, flights in various embodiments.

The flights are a plurality of nested flights and/or are equally spaced in various embodiments.

The distance from the outer edge to an axis of the drum is substantially the same for the entire outer edge in one embodiment.

The seal is a compressible seal and/or a flat seal in various embodiments.

The flights extend from the first end to the second end in one embodiment.

An added portion extends from the second end, in a direction away from the first end, and a rigid screen is mounted about the added portion, in one embodiment.

Other principal features and advantages of the invention will become apparent to those skilled in the art upon review of the following drawings, the detailed description and the appended claims.

Figure 1:
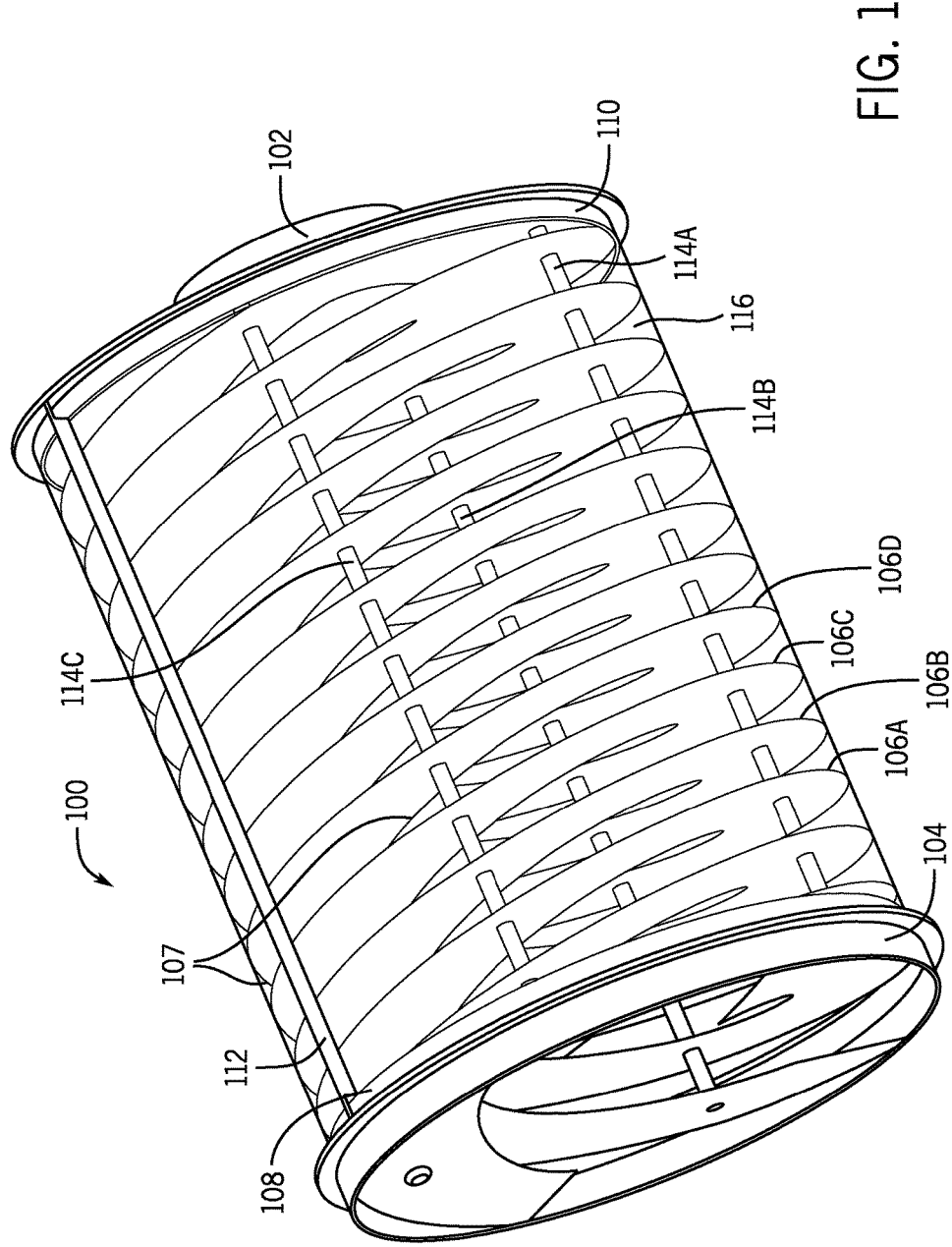
FIG. 1 is a perspective view of a rotary drum with a flexible screen in accordance with the preferred embodiment.

Before explaining at least one embodiment of the invention in detail it is to be understood that the invention is not limited in its application to the details of construction and the arrangement of the components set forth in the following description or illustrated in the drawings. The invention is capable of other embodiments or of being practiced or carried out in various ways. Also, it is to be understood that the phraseology and terminology employed herein is for the purpose of description and should not be regarded as limiting. Like reference numerals are used to indicate like components.

DETAILED DESCRIPTION OF THE PREFERRED EMBODIMENTS

While the present invention will be illustrated with reference to a particular screen and configuration it should be understood at the outset that the rotary drum screen can also be implemented with other screens arranged in other manners. Rotary drum, as used herein, is a generally cylindrical drum that either rotates or that the interior thereof rotates.

The present invention relates to a rotary drum with a flexible mesh screen for use in food processing. The screen is mounted with support such that it can be easily cleaned, yet retains a large percentage of open area. The drum is mounted in a frame and rotated as known in the prior art. However, the construction of the drum and the use and arrangement of mesh screen is not found in the prior art. The invention includes structure to mount the flexible screen that supports the screen and allows liquid to drain from the screen while retaining the solid matter.

The rotating cylindrical structure has a precise outside diameter defined by the outer diameter of helical flights along the length of the screening section. Each end of this section has a sealing band area for holding each end of the screen. Sealing band area, as used herein, is an area in which a screen can be affixed such that the screen is held in place, and food product cannot pass through. The helical flights are preferably nested flights, and move product from the inlet end of the drum to the discharge end of the drum. The flights are nested and spaced in such a way to provide intermittent support for the flexible screen. In the preferred embodiment, these flights are nested to provide torsional resistance required for a robust structure intended for cyclical rotation, by making the flight follow a large angle from the center line. Multiple flights are then used to keep the spacing of the gaps between flights to a desired small distance.

A supporting beam penetrates through all the flights is welded to the flights to create a rigid structure that provides both bending and torsional resistance. Thus, in this embodiment the flights themselves need not be heavy and expensive because support is provided by the beams.

The mesh screen is wrapped around the rigid and precise structure, and stretched tight, sealing the edges with the bands on either side, and supported regularly along the length of the screen by the flights. A compressible seal along the length of the seam, or a flat seal along the length of the seam of the screen, is used to contain liquid product at that transition.

Turning now to FIG. 1, a perspective view of a drum 100 in accordance with the preferred embodiment includes a first inlet end 102, a second outlet end 104, four nested flights 106A-D, a pair of sealing bands 108 and 110, a longitudinal seal 112, three beams 114A-C and a mesh screen 116. A stationary cleaning spray bar is preferably mounted with the drum, to clean the screen. The simple stationary spray bar can clean the screen as the screen (and drum) rotate past the spray bar. There are no moving parts for such a sprayer, and thus it is very reliable. Also, a single line cleaning spray bar uses less spray (than an array) and does not adversely affect the capacity of the screen. Cleaning spray bar, as used herein, is a bar used to spray water or other fluid to clean a surface such as a screen. Alternatives provide for multiple spray bars, a moving spray bar, a non-linear spray bar, or spraying only part of screen 116.

Water or liquid with food product enters drum 100 at first inlet end 102. End 102 includes an opening, preferably centered axially, with about 50%-33% of end 102 open. One application calls for a tank of water to receive twenty pounds per minute of product, and then discharges 40 pounds per minute of product and water or liquid into the drum. Drum 100 is mounted in a conventional fashion and rotated clockwise so that helical flights 106 move product from first end 102 toward second outlet end 104. Outlet end 104 is preferably entirely open. The preferred embodiment provides that for every 2400 pounds of food product input to the drum, about 3 pounds of food product output slurry is provided, with the remaining weight being screened liquid or water. Preferably, the water or liquid may be used upstream for processing product. Ends 102 and 104 are comprised of a rigid structural material, that help form the rigid drum. Rigid structural material, as used herein, is material that retains is shape and position and is able to support other portions of a machine.

Flights 106 are nested in the preferred embodiment to provide the desired support for screen 116, as well as to move the water or liquid and product through drum 106 at a desired rate. Flights 106 can have a lesser or greater angle if less or more support is desired. Also, there can be a different number of nested flights, or a single non-nested flight, depending on the desired angle and support spacing. Flights 106 have a desired outer diameter to support the screen, and are preferably made with strict tolerance so that the screen can be more effectively wrapped about the flights. Lines 107 trace the inner and outer diameters of helical flight 106A.

Mesh screen 116 is wrapped about the outer edge of flights 106 such that screen 116 forms a cylinder. Outer edge of the flights includes the sealing bands and the outer diameters of the flight or flights. Screen 116 is preferably about as flexible as a nylon window screen. A mesh screen is preferred because it captures long thin pieces because it has holes, not slots. Alternatives provide for other screens, such as bidirectional, metal, nylon, other directional screens, and other screens that have no inherent supporting structure.

Screen 116 is held in place at ends 102 and 104 of drum 100 by sealing bands 108 and 110 located in a sealing band area. Longitudinal seal 112 is preferably a compressible seal or a flat seal, and secures the longitudinal edges of screen 116. Screen 116 is sealed with tension along seal 112 to draw screen 116 tight. Screen 116 rotates with drum 100 because screen 116 is tightly held to flights 106 and sealing bands 108 and 110. Seal 112 is a 4 inch wide longitudinal strip in one embodiment. Alternatives provide for seal 112 to be other than a straight line—for example it could be an arc or partial helix, or otherwise not parallel to the axis of drum 100. Seal 112 preferably clamps the edges of screen 116 into place. Screen 116 can be folded back for ease of clamping. The edge of the screen, as used herein, is the portion held in the seal, even if the screen is folded back, so a portion is unsecured. Sealing bands 108 and 110 preferable clamp the ends of screen 116 to ends 102 and 104 of drum 100.

Figure 2:
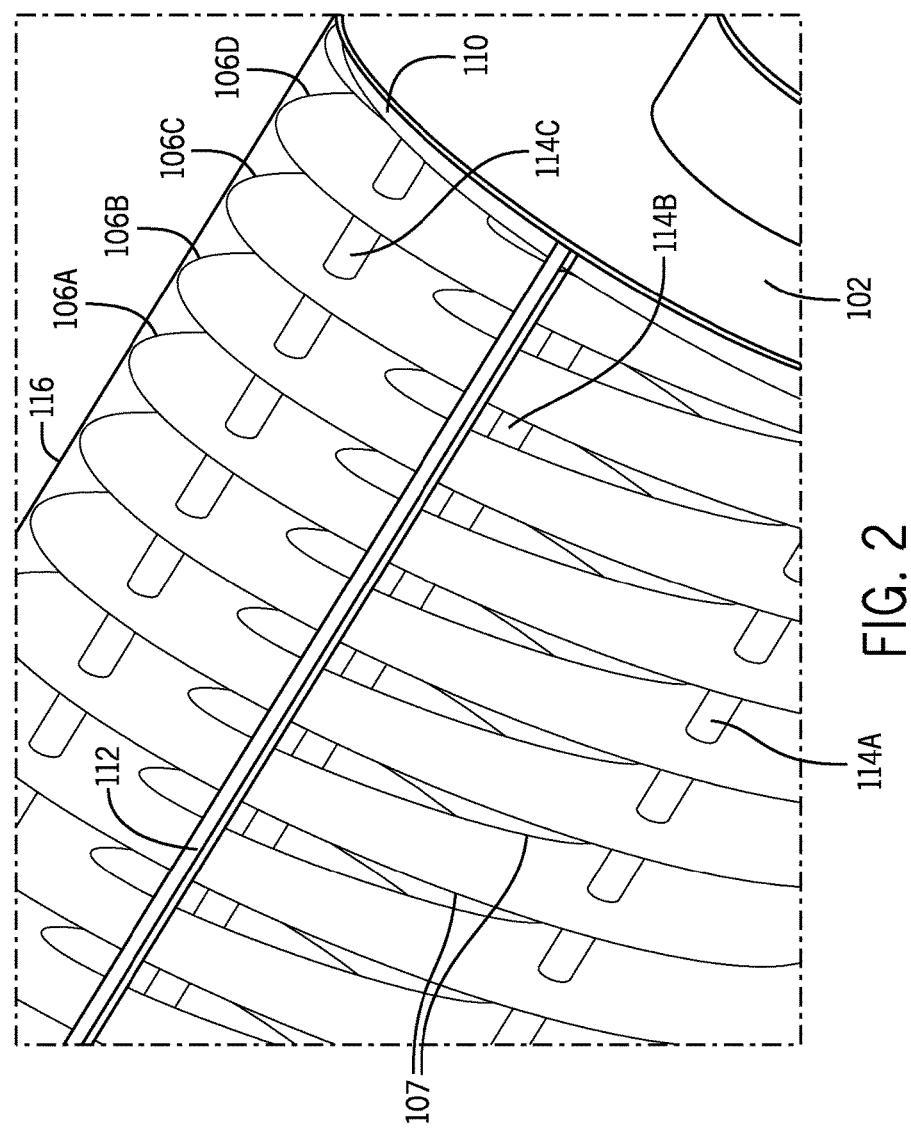
FIG. 2 is a partial perspective view of a rotary drum with a flexible screen in accordance with the preferred embodiment.
Figure 3:
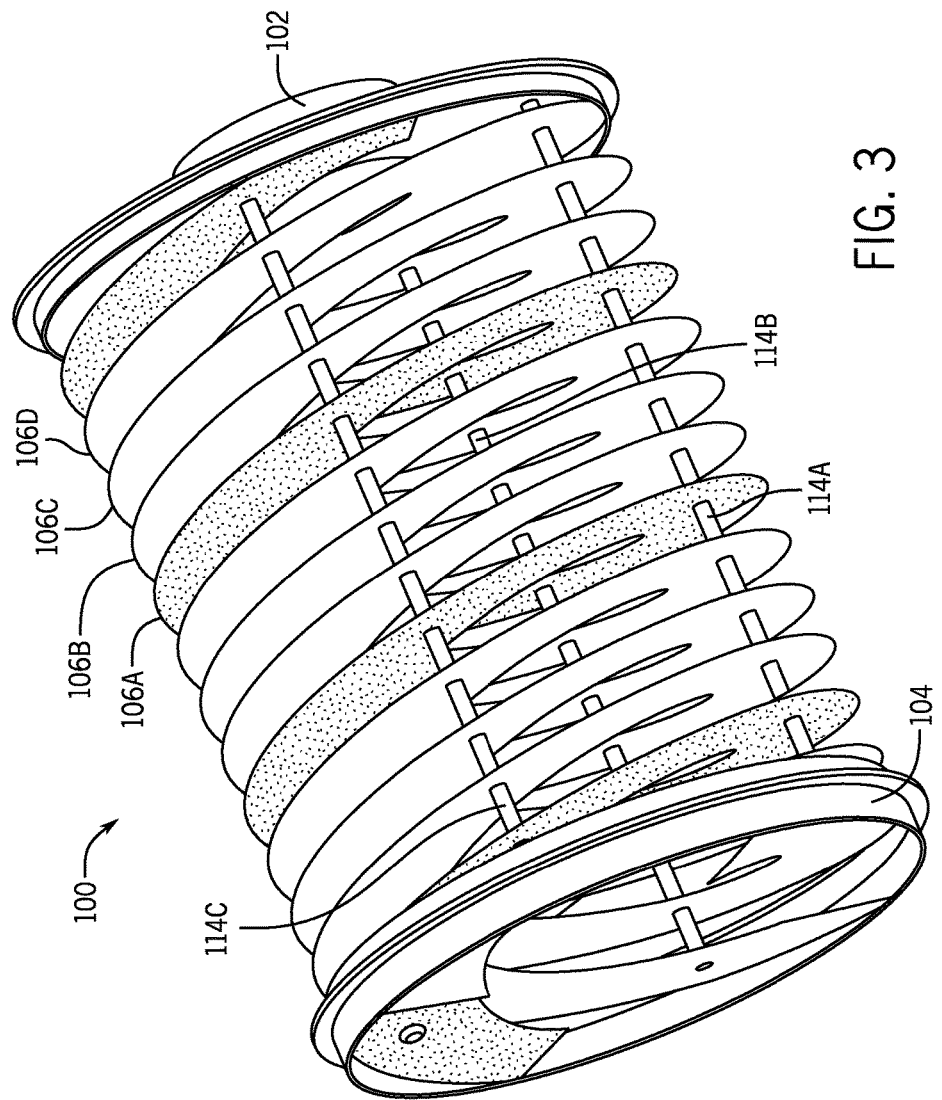
FIG. 3 is a perspective view of a rotary drum prior to being wrapped with a flexible screen in accordance with the preferred embodiment.

Referring now to FIG. 2, a closer view of a portion of drum 100 near end 102 may be seen. Beams 114A-C support flights 106A-D. Flights 106 may be welded or otherwise affixed to beams 114. Alternatives provide for fewer or more beams 114 (or omitting them altogether). Referring now to FIG. 3, drum 100 is shown, but without screen 116 mounted about it. Flight 106A is shaded so that it may more readily be seen.

As may be seen from the description above and the drawings, drum 100 has a self supporting helical structure defined by flights 106, preferably with a precise outside diameter, that supports flexible mesh screen 116. Thus, the only support for screen 116 is helical flights 106, which provide support throughout to help screen 116 wear and to support both beam load and torsion load. The helix angle, along with the RPM's of drum 100 control the retention time on screen 116. Screen 100 is easily changed by wrapping around this cylinder in a longitudinal direction and sealing with longitudinal seam 112, and preferably with sealing bands 108 and 110. This arrangement is scalable to handle several thousand gallons of water per minute.

Applications for the present invention include any food products in water or liquid, or water or liquid that needs to be screened. For example, it is well suited for poultry processing (particularly reclaiming water used in poultry processing), very fine food particles like radish seeds and fine pasta, waste water or liquid, etc.

One alternative provides for a series of drums such that the output of one drum is the input of the next drum. This provides a way to remove more water or liquid for a given speed, screen size, and flight arrangement. One or more of the drums can be flexible screen drums, and the remaining drums can be rigid screen (wedge wire or perforated metal), depending on the desired application. Another alternative is to provide a section of a single drum with wedge wire or perforated metal (for example the last foot of the drum can be wedge wire). This added portion can be bolted to drum 100, for example bolted onto end 104. The wedge wire or perforated metal portions can be a drying section, but intermittently cleaned. Alternatively it can be continuously sprayed, or the mesh screen can be intermittently sprayed.

Figure 4:
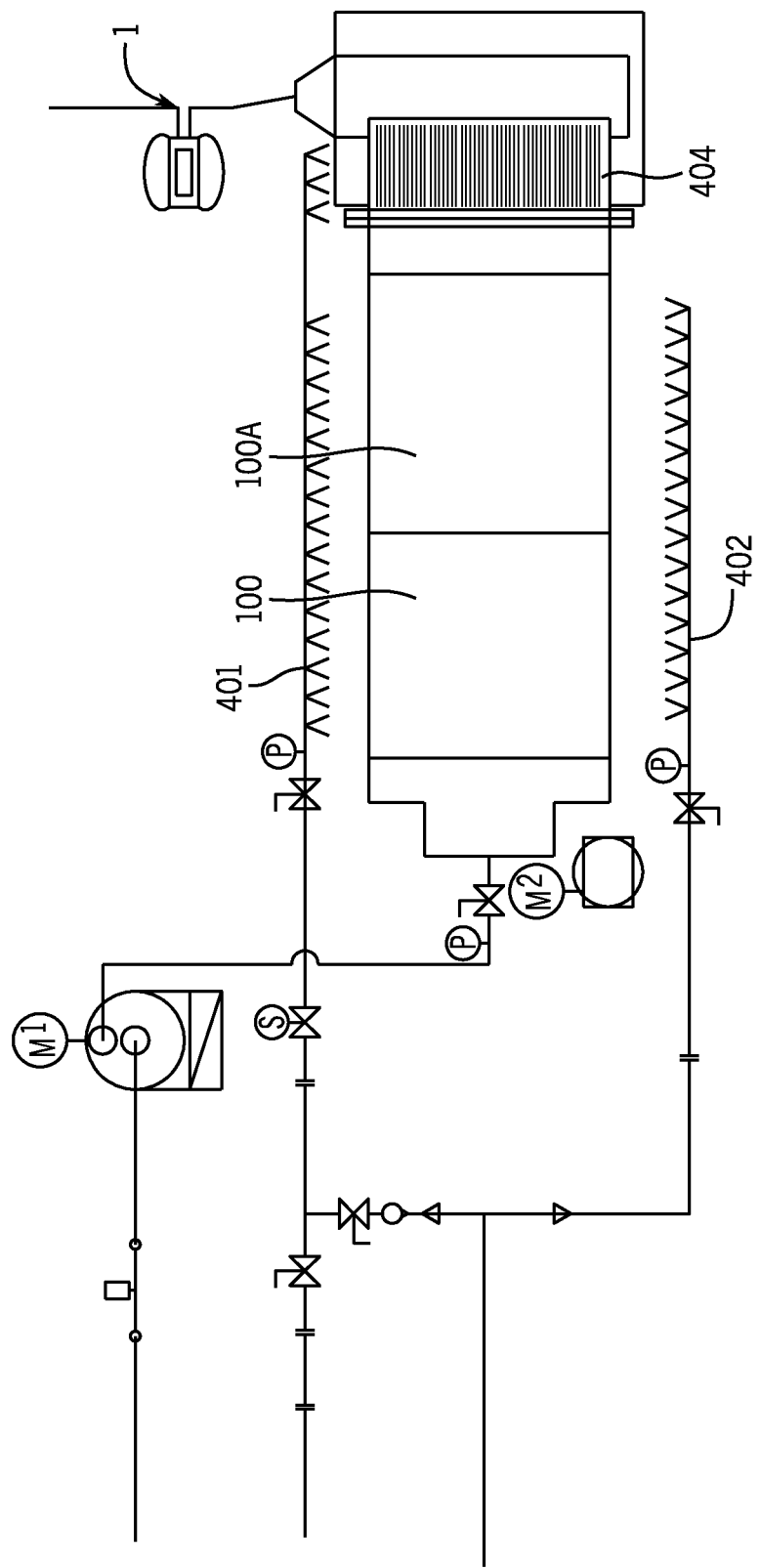
FIG. 4 is a diagram of a food processing system with a rotary drum in accordance with the preferred embodiment.

FIG. 4 shows a system incorporating the invention. Drum 100-100A may be a single drum as described above, or they may be two separate drums 100 and 100A. An add-on section 404 is comprised of wedge wire screen. A pair of spray bars 401 and 402 are shown. Spray bar 401 includes a portion over wedge wire section 404, and is operated intermittently. Spray 402 is on continuously. Motors M1 and M2 are shown, along with valves and gauges.

Numerous modifications may be made to the present invention which still fall within the intended scope hereof. Thus, it should be apparent that there has been provided in accordance with the present invention a method and apparatus for a rotary drum screen that fully satisfies the objectives and advantages set forth above. Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

The embodiments of the invention in which an exclusive property or privilege is claimed are defined as follows:

1. A food processing machine, comprising;
   a rotary drum rotatably mounted in a frame, wherein the drum has an inlet first end, and an outlet second end, wherein each of the first and second ends is comprised of rigid structural material, and each of the first and second ends includes a sealing band;
   at least one helical set of flights extending between the first end and the second end, wherein the at least one helical set of flights has an outer edge, wherein the rotary drum includes the at least one helical set of flights such that when the rotary drum is rotated, the at least one helical set of flights rotates in the same direction as the rotary drum;
   at least one removable flexible mesh screen, capable of being wrapped about the outer edge, wherein the outer edge intermittently supports the screen wrapped thereabout, and wherein the sealing band of the first end and the sealing band of the second end affix and secure the screen to the drum, and this secure attachment results in a rotation of the screen with the at least one helical set of flights when the drum is rotated;
   and
   a seal extending between the first end and the second end, wherein the seal joins a first longitudinal edge and a second longitudinal edge of the screen, whereby liquid can pass through the screen and food product is retained in the drum by the screen.

2. The food processing machine of claim 1, further comprising at least one supporting beam attached to and supporting the at least one helical set of flights.

3. The food processing machine of claim 2, wherein the at least one supporting beam is welded to each flight in the at least one helical set of flights.

4. The food processing machine of claim 3, wherein the at least one supporting beam is disposed between the outer edge of the at least one helical set of flights and an axis of the drum.

5. The food processing machine of claim 2, wherein the at least one supporting beam is a plurality of supporting beams, each disposed to be parallel to an axis of the drum, and each radially equidistant from a pair of adjacent supporting beams.

6. The food processing machine of claim 1, wherein the at least one helical set of flights is a plurality of interleaved flights such that each flight from a first set of flights is adjacent to an adjacent flight from a second set of flights.

7. The food processing machine of claim 6, wherein the plurality of interleaved flights are equally spaced.

8. The food processing machine of claim 1, wherein the distance from the outer edge to an axis of the drum is substantially the same for the entire outer edge.

9. The food processing machine of claim 1, further comprising a cleaning spray bar disposed to spray fluid on at least a portion of the screen.

10. A food processing machine, comprising;
    a rotary drum rotatably mounted in a frame, wherein the drum has a first end and a second end, wherein each of the first and second ends is comprised of rigid structural material, and each of the first and second ends includes a sealing band;
    at least one helical set of flights extending from the first end to the second end, wherein the at least one helical set of flights has an outer edge, wherein the rotary drum includes the at least one helical set of flights such that when the rotary drum is rotated, the at least one helical set of flights rotates in the same direction as the rotary drum;
    a flexible mesh screen wrapped about the outer edge, wherein the outer edge intermittently supports the screen, and wherein the sealing band of the first end and the sealing band of the second end affix and secure the screen to the drum, and this secure attachment results in a rotation of the screen with the at least one helical set of flights when the drum is rotated;
    a seal extending from the first end to the second end, wherein the seal joins a first longitudinal edge and a second longitudinal edge of the selected screen, whereby liquid can pass through the screen and food product is retained in the drum by the screen; and
    a cleaning spray bar disposed to spray fluid on at least a portion of the screen.

11. The food processing machine of claim 10 wherein the cleaning spray bar is stationary.

12. The food processing machine of claim 10 wherein the cleaning spray bar is not stationary.

* * * * *